June 12, 1962 W. McKENZIE M. MORRISON 3,038,497
FLUID CONTROL VALVE ASSEMBLIES
Filed April 8, 1960 3 Sheets-Sheet 1

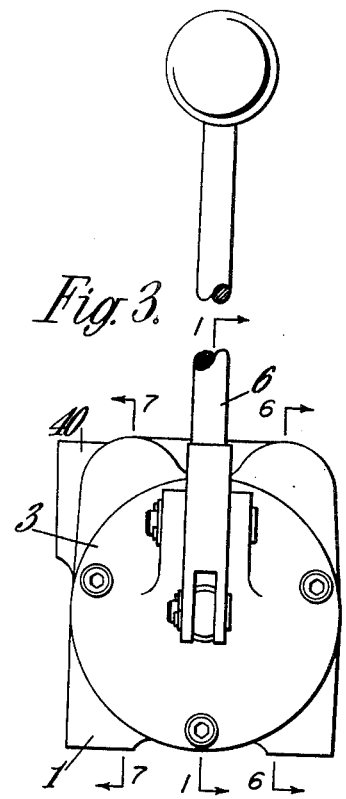
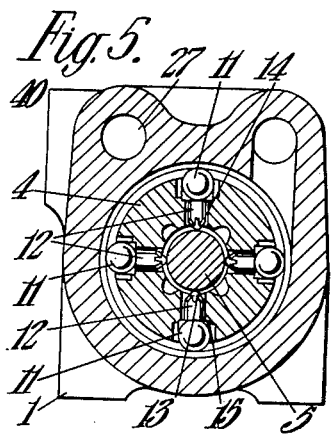

June 12, 1962  W. McKENZIE M. MORRISON  3,038,497
FLUID CONTROL VALVE ASSEMBLIES Filed April 8, 1960  3 Sheets-Sheet 3

United States Patent Office 3,038,497
Patented June 12, 1962

3,038,497
FLUID CONTROL VALVE ASSEMBLIES
William McKenzie Meek Morrison, Wolverhampton, England, assignor to Turner Manufacturing Co., Limited, Wolverhampton, England
Filed Apr. 8, 1960, Ser. No. 21,008
Claims priority, application Great Britain Apr. 14, 1959
7 Claims. (Cl. 137—622)

This invention relates to fluid control valves and has been devised with the general object of providing an improved selector valve for use with hydraulic or pneumatic systems as an alternative to spool or dumbell type valves which are subject to leakage and relatively expensive to manufacture.

A fluid control valve assembly according to the invention therefore comprises a selector which is movable within a cylinder formed with a bank of fluid ports each of which is controlled by a ball, the plunger being formed with cam surfaces which in certain selected positions of the plunger act through intermediate members to move the balls from their seatings and place selected ports in communication with one another.

There may be one or more banks of ports spaced around the periphery of the cylinder.

For a better understanding of the invention however reference should be made to the accompanying drawings which illustrate one form of selector valve assembly which is at present preferred and in which:

FIGURE 3 is a right hand end elevation of the assembly shown in FIGURES 1 and 2;

Figure 1:
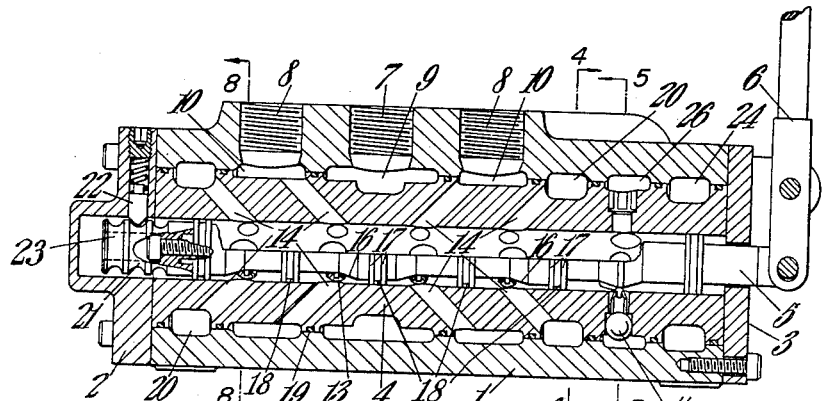
FIGURE 1 is a longitudinal central section, corresponding to line 1—1 of FIGURE 3, of a selector valve assembly.
Figure 2:
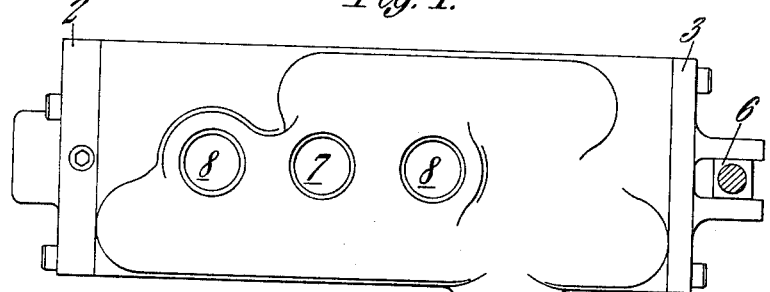
FIGURE 2 is a plan view of the assembly shown in FIGURE 1.
Figures 4, 8:
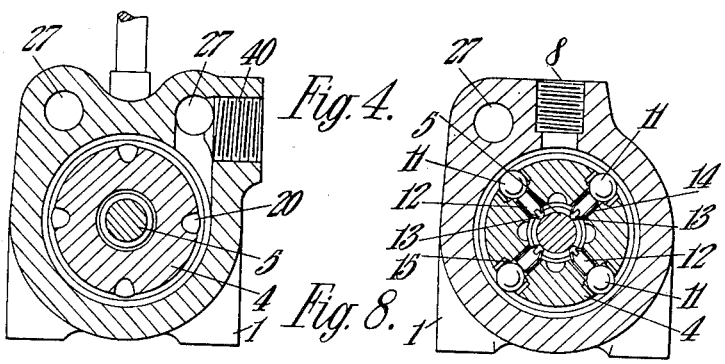
Figure 6:
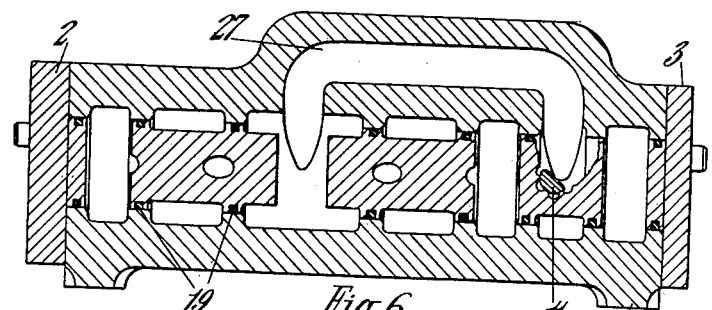
Figure 7:
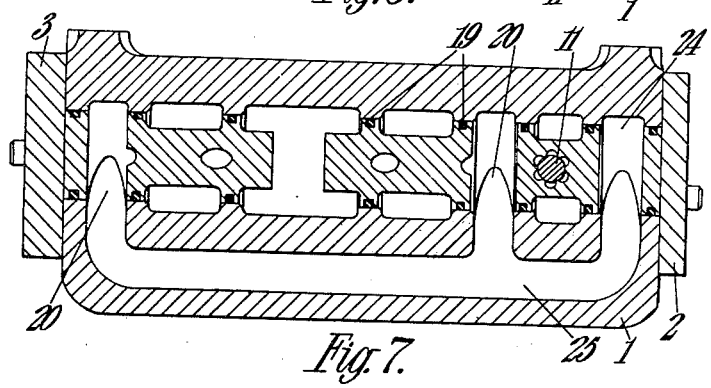

FIGURE 4 is a section on line 4—4 of FIGURE 1;
FIGURE 5 is a section on line 5—5 of FIGURE 1;
FIGURE 6 is a section on line 6—6 of FIGURE 3;
FIGURE 7 is a section on line 7—7 of FIGURE 3; and
FIGURE 8 is a section on line 8—8 of FIGURE 1.

Referring now to the drawings there is shown in FIGURES 1 to 8 a selector valve assembly of the so-called "open centre" type which has been developed for use in controlling the supply of hydraulic fluid in machine tools, tractors, fork lift trucks and other equipment. This valve assembly comprises an outer casing 1 containing between a pair of end covers 2 and 3 and a cylindrical liner 4. The casing has a fluid supply inlet 7 an exhaust outlet 40 and on each side of the supply inlet 7 a pair of flow passages 8 connected to the mechanism or device with which the assembly is to be used. The interengaging cylindrical surfaces of the casing and the liner are sealed by resilient washers 19 and define between them a central annular space 9 open to the supply inlet 7 and two separate flanking annular spaces 10 open to the passages 8. Also at the ends of the casing and liner are similar but deeper annular spaces 20 which are joined by a transfer passage 25 (FIGURE 7) to the exhaust outlet.

Extending obliquely between the centre and the outside of the liner 4 are four axially spaced banks or four ports 14, the four ports in each bank being equally spaced around the liner wall and radially directed as shown in FIGURE 4, each bank of ports communicating with a different one of the four annular spaces 10, 20.

Each port 14 has a valve seat 15 of cruciform shape and contains a ball valve 11 which is normally held against its seat by fluid pressure. For lifting each such ball valve off its seat there is freely mounted in the middle of the associated port a push rod 12 of which the inner end is swaged around another smaller ball 13.

In the central bore of the liner 4 there is fitted a selector plunger 5 which is movable a short distance axially between any of three predetermined positions by manual operation of a lever 6 pivotally connected to the plunger and lugs on the casing 1. The plunger is formed at intervals along its length with pairs of sealing lands 17 containing between them sealing washers 18 which serve to isolate each bank of ports 14 and their associated ball valves 11 from the neighbouring bank.

Intermediate the pairs of sealing lands 17, the plunger is formed with four frusto-conical cam surfaces 16 positioned so as selectively to engage the small balls 13 of the banks of valves when the plunger 5 is moved in one direction or the other to lift the associated push rods 12 and thence the ball valves 11 off their seats.

At the right hand end of the liner there is an annular space 26 surrounding another bank of ball valves, a bore 27 connecting the inlet return passage 24 and a transfer passage 25 connecting passages 20, 24 to the exhaust outlet 40.

In FIGURE 1 the selector plunger 5 is illustrated in the neutral or intermediate position in which it is retained by a spring biased detent 22 engaging the centre groove of a triple grooved collar 23 fitted on the outward end of plunger 5. In this neutral position all the ball valves 11 are on their seats and there is thus no fluid flow between annular space 9 through ports 14 and one or other of annular spaces 10. The ball valves at the right hand end of the liner are however open and provide a by-pass at low pressure for the fluid being supplied to the equipment.

When plunger 5 is moved axially from the position shown, one of the two central banks of ball valves opens to permit fluid to flow from the central annular space 9 through the ports of one bank to one or other of the flow passage 8 delivering to the equipment. Simultaneously the ball valves on one of the end banks is also opened to permit fluid to be accepted from the equipment along the other of the passages 8 and to flow via the appropriate annular space 10 and bank of ports 14 to the exhaust outlet.

When the selector plunger is moved axially to its other extreme position the direction of flow of fluid through the passages 8 is reversed.

It should be apparent from the foregoing that the selector valve assembly according to the invention represents a substantial improvement upon all hitherto devised spool valve assemblies which almost invariably permit leakage of fluid between the spool lands and are liable to be jammed by impurities suspended in the operating fluid. The selector valve assembly according to the invention permits the flow of fluid containing suspended matter at extremes of temperature without substantial deterioration in performance.

Any number of banks of ball valves can be used and the number of ball valves in each bank may be varied. It should be apparent also that by alteration of the angle and the axial extent of the axially movable cam surfaces the rate and amount of fluid flow permitted by any or all valves in a particular bank may be adjusted. Also due to the relatively slight movement of selector plunger or shaft which is necessary to open the valves the assembly is very suitable for servo or manual operation at high speeds.

I claim:
1. A fluid control valve assembly comprising an outer casing having fluid supply, feed and return, and exhaust openings communicating with its interior, a hollow linear sealingly contained in the casing and having a series of ports extending obliquely from its interior to separate annular spaces between the outside of the liner and the inside of the casing, ball valves mounted in the liner for controlling fluid flow in and between said ports and a selector element slidable within the liner and having cam surfaces for opening selected ball valves depending upon the position of the plunger relative to the liner.

2. A fluid control valve assembly as set forth in claim 1 in which the selector element is an axially movable plunger bearing frusto-conical cam surfaces for selectively operating said ball valves when the plunger is moved to various predetermined positions.

3. A fluid control valve assembly as set forth in claim 1 in which the cam surfaces act on an auxiliary ball which causes movement of an associated valve ball.

4. A fluid control valve assembly as set forth in claim 1 in which the cam surfaces act on an auxiliary ball and a push rod transmits movement from the auxiliary ball to an associated valve ball.

5. A fluid control valve assembly as set forth in claim 1 in which in one position of said selector element at least one valve is closed so that there is no flow of fluid through the assembly.

6. A fluid control valve assembly comprising an outer casing having fluid supply feed and return, and exhaust openings communicating with its interior, a hollow cylindrical liner sealingly contained in the casing and having a plurality of axially spaced banks of ports, the ports in each bank being spaced circularly around the liner wall and extending obliquely through the liner wall to give access from the interior of the liner to separate annular spaces between the outside of the liner and the inside of the casing, ball valves mounted in the liner for controlling fluid flow through said ports and a selector element slidable within the liner and having cam surfaces for opening selected ball valves to control fluid flow between said fluid supply, feed and return, and exhaust openings.

7. A fluid control valve assembly as set forth in claim 6 in which said selector element has cam surfaces adapted to open one bank of valves whilst the valves in the remainder of the banks are closed.

References Cited in the file of this patent
UNITED STATES PATENTS

| | | |
|---|---|---|
| 2,342,770 | Temple | Feb. 29, 1944 |
| 2,532,552 | Jirsa et al. | Dec. 5, 1950 |
| 2,572,705 | Edman | Oct. 23, 1951 |
| 2,579,134 | Worthington | Dec. 18, 1951 |
| 2,612,375 | Worthington | Sept. 30, 1952 |
| 2,729,224 | Stueland | Jan. 3, 1956 |
| 2,823,698 | Larison | Feb. 18, 1958 |